March 14, 1972 J. M. YEDIDIA ET AL 3,649,451
NUCLEAR REACTOR CONTAINMENT SYSTEM
Filed Sept. 23, 1968 3 Sheets-Sheet 1

United States Patent Office 3,649,451
Patented Mar. 14, 1972

3,649,451
NUCLEAR REACTOR CONTAINMENT SYSTEM
Joseph M. Yedidia and Peter W. Reichelsdorfer, Pittsburgh, Joseph W. Dorrycott, Monroeville, and James G. Russell, Pittsburgh, Pa., assignors to Westinghouse Electric Corporation, Pittsburgh, Pa.
Filed Sept. 23, 1968, Ser. No. 776,295
Int. Cl. G21c 19/40
U.S. Cl. 176—37                    9 Claims

ABSTRACT OF THE DISCLOSURE

A nuclear reactor containment system wherein a nuclear reactor vessel is supported within a normally dry well and means are provided for flooding the dry well to protect the nuclear core against melt down in the event of a vessel failure. A first quantity of coolant fluid, for example, borated water, is provided to fill the dry well to a level beneath the vessel, and a second quantity of coolant fluid, which may be obtained from condensed primary coolant that had been lost through a rupture in the primary system, is utilized to fill the dry well to a sufficient level to protect the nuclear core.

BACKGROUND OF THE INVENTION

This invention is directed to a nuclear reactor containment system, and more particularly a containment system wherein means are provided for assuring that coolant fluid will cover the nuclear core in the event of a vessel rupture.

Heretofore many systems have been developed which inject coolant fluid into the nuclear reactor vessel upon the occurrence of a loss of coolant accident. Such systems in general include a means for sensing a break in any of the primary coolant loops; which means then actuates pumps or opens valves which cause a sufficient amount of fluid to be injected into the reactor vessel to cool the nuclear core and thereby prevent melt down.

Such emergency injection systems may well be ineffective in preventing core melt down should the reactor vessel be ruptured. Reactor vessels are subject to a degree of hardening and embrittlement due to the continuous neutron exposure and may be susceptible in this state to rupture due to thermal shock. It would appear possible that the emergency injection into the vessel of coolant at a lower temperature than the vessel initiated by a loss of coolant accident, could cause such a thermal shock as would lead to vessel failure.

It is presently the practice in some nuclear plants to support the reactor vessel within a well which is substantially dry. Such an arrangement provides a relatively large volume or space to which coolant fluid can escape should the vessel rupture. Such a dry well, however, is necessary if devices including instrumentation leads are to be conducted from the pressure vessel to operational areas.

Means must accordingly be provided which will provide ease of access of devices to the reactor vessel but which provide a limited escape volume for coolant fluid should the reactor vessel rupture. Such means must also be fail-safe, i.e., it must not operate in a harmful manner should actuation be improperly initiated.

SUMMARY OF THE INVENTION

The possibility of a nuclear core melt down due to rupture of the reactor vessel is minimized in accordance with this invention by providing a fail-safe system whch floods the reactor dry well in the improbable event of a loss of coolant accident.

The system of this invention essentially comprises various means which cause the dry well to be flooded with a coolant fluid, such as borated water, to a level at least sufficient to protect the reactor core should a loss of coolant accident occur. However, the system is so designed that a spurious signal indicating a loss of coolant accident cannot cause coolant fluid to flood the dry well and thus possibly itself initiate vessel rupture due to thermal shock. The various systems are operative to prevent thermal shock due to a spurious signal in that the coolant fluid utilized to cover the nuclear core is obtained from that coolant fluid lost during a loss of coolant accident. More particularly, a pumping means is connected to a sump situated in the floor of the containment structure for collecting coolant fluid lost from the primary system and other sources upon the occurrence of a loss of coolant accident. Means are provided for sensing a loss of coolant accident which means initiates action of the pump. However, the pump cannot supply coolant to the dry well unless this coolant has first been accumulated in the sump and such accumulation occurs only by virtue of a loss of coolant accident.

In one embodiment, in accordance with this invention, one or more coolant containing vessels are situated within the containment and connected through valves to the dry well. These vessels contain only that amount of water which will fill the dry well to a level beneath the pressure vessel. Upon the occurrence of loss of coolant accident the valves are opened and the dry well is filled to a first level beneath the pressure vessel. At the same time the pumps connected to the sumps which collect loot coolant are actuated. The dry well is then filled to a second level sufficient to protect the nuclear core, from the primary coolant available due to the loss of coolant accident as such coolant is accumulated in the sump.

In a second embodiment, coolant, preferably in liquid form, is continuously situated beneath the pressure vessel in the dry well. This liquid is covered by a floating seal so that it is not blown out should a loss of coolant accident or a rupture occur within the dry well. A second quantity of liquid may then be pumped from the sump to fill the dry well to a level sufficient to protect the nuclear core. A floating seal is utilized so that the instrumentation leads for the in-core instruments may freely pass through the dry well without being ruptured by movement of the leads due to thermal expansion of the pressure vessel.

In both of the above embodiments, standpipes are situated on the conduit openings from the dry well so that the liquid injected into the dry well from the flood-up systems in accordance with this invention may reach a level approximately even with the upper part of the nuclear core.

DESCRIPTION OF THE DRAWINGS

For a better understanding of the invention reference may be had to the accompanying drawings, in which.

DESCRIPTION OF THE PREFERRED EMBODIMENTS

Figure 1:
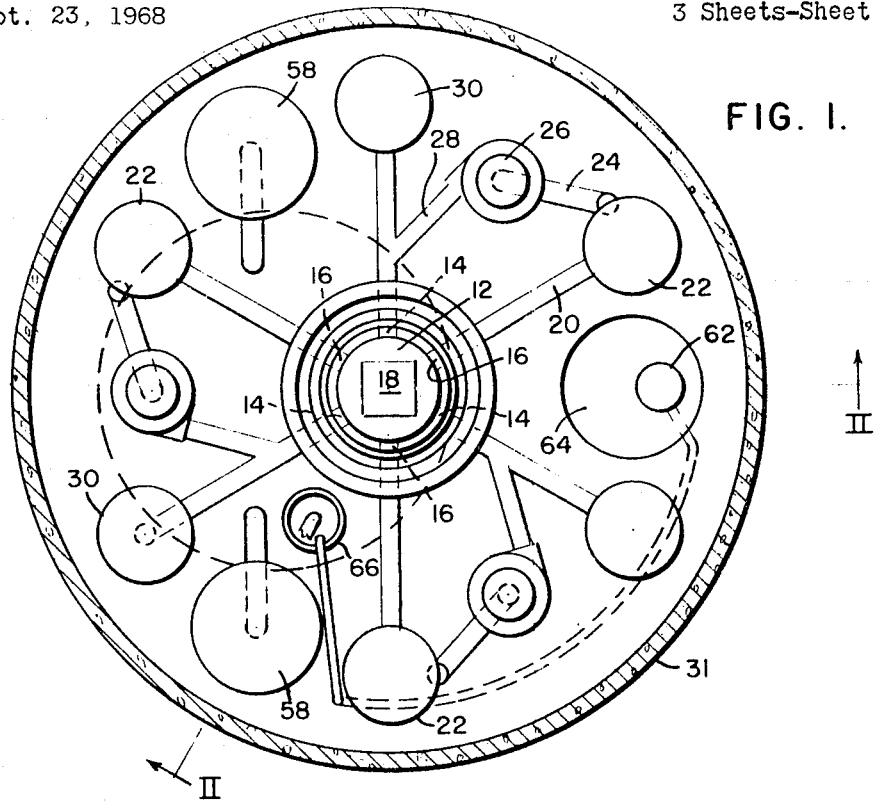
FIG. 1 shows a top plan view of an arrangement of a nuclear containment system in accordance with this invention and having a portion of the outer containment vessel broken away for clarity.
Figure 2:
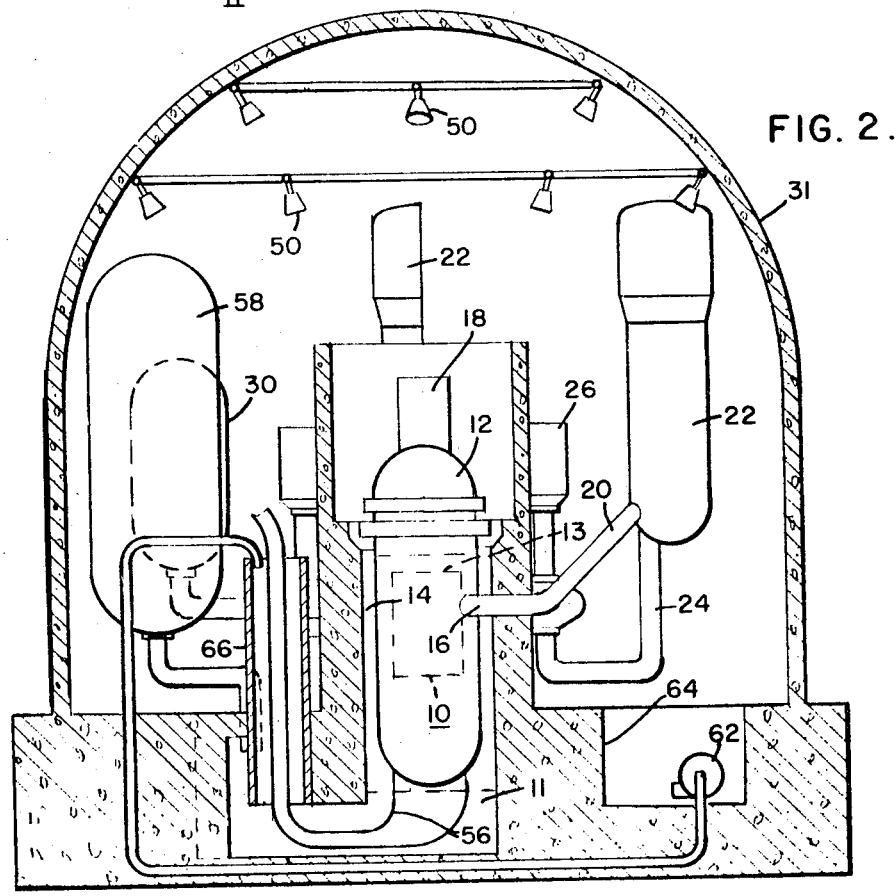
FIG. 2 shows an elevational cross-section along lines II—II of FIG. 1.

Referring now to FIGS. 1 and 2, there is illustrated a nuclear steam generating system of the pressurized water type incorporating a dry well flood-up system in accordance with this invention. A pressure vessel 10 is shown which forms a pressurized container when sealed by its head assembly 12. Pressure vessel 10 is supported within a dry well 11. The vessel 10 has coolant flow inlet means 14 and coolant flow outlet means 16 formed integral with and through its cylindrical wall. As is known in the art, the vessel 10 contains a nuclear core illustrated schematically by dashed lines 13 which generates substantial amounts of heat depending inter alia upon the position of a control means; the mechanisms for which are illustrated at 18. The heat generated by the reactor core 13 is conveyed from the core by a heat transfer coolant fluid entering through inlet means 14 and exiting through outlet means 16. After operation at power is achieved the loss of such a coolant flow or other heat dissipating means might quickly melt the core structure.

The flow exiting through outlet means 16 is conveyed through hot leg conduit 20 to a heat evchange steam generator 22. The steam generator 22 is of a type well known in the art wherein the heated coolant flow is conveyed through tubes (not shown) which are in heat exchange relationship with secondary system water which is heated to produce steam. The steam produced by generator 22 is commonly utilized to drive a turbine (not shown) for the production of electricity. The flow is conveyed from the steam generator 22 through conduit 24 to a pump 26 from which it proceeds through cold leg conduit 28 to the inlet means 14. Thus, it can be seen that a closed recycling primary or steam generating loop is formed with the vessel 10, the steam generator 22, and the pump 26. The generating system illustrated in this example has three such closed systems or loops. The number of such systems should be understood to vary from plant to plant but currently two, three, or four are employed. Each loop also has connected thereto an accumulator tank 30 which automatically dumps its entire contents through cold leg conduit 28 into the pressure vessel should the pressure in the vessel 10 drop below a predetermined minimum; most generally due to a loss of coolant accident occurring in one of the loops. The entire nuclear steam generating system is enclosed within a sealed outer containment structure 31.

In the event of such a break in one of the closed primary or steam generating loops the capacity of all the primary systems to dissipate heat produced by the nuclear core might be substantially impaired; possibly resulting in a melt-down of the core structure and the release of dangerous fission products. Various safety means including the accumulator tank system mentioned above may be included in nuclear steam generating systems to protect against such a contingency. In addition to the accumulator tank 30 which provides a ready source of coolant, other emergency cooling systems are utilized to prevent core melt-down. In particular with reference to FIG. 3, high and low head emergency injection systems are supplied with coolant fluid from a refueling water storage tank 32, and as depicted feed into an emergency injection line 34. The low head injection system comprises a check valve 36, a heat exchanger 38, a pump 40, and a remotely operated valve 42. The high head injection system includes a remotely operated valve 44 and a high head injection pump 46. As depicted, the accumulator 30 and the high and low head injection systems feed their water into the cold leg conduit 28. An emergency spray system 48 having a plurality of spray heads 50 is also supplied with cooling fluids from the refueling tank 32. This system also includes remotely operated pump 52 and a remotely operated valve 54. The safety systems referred to above are described in greater detail in a copending application 676,987, now Pat. 3,528,884 filed Sept. 28, 1967, by Allan R. Collier and Robert J. Creagan, on a Safety Cooling System for a Nuclear Reactor.

Figure 3:
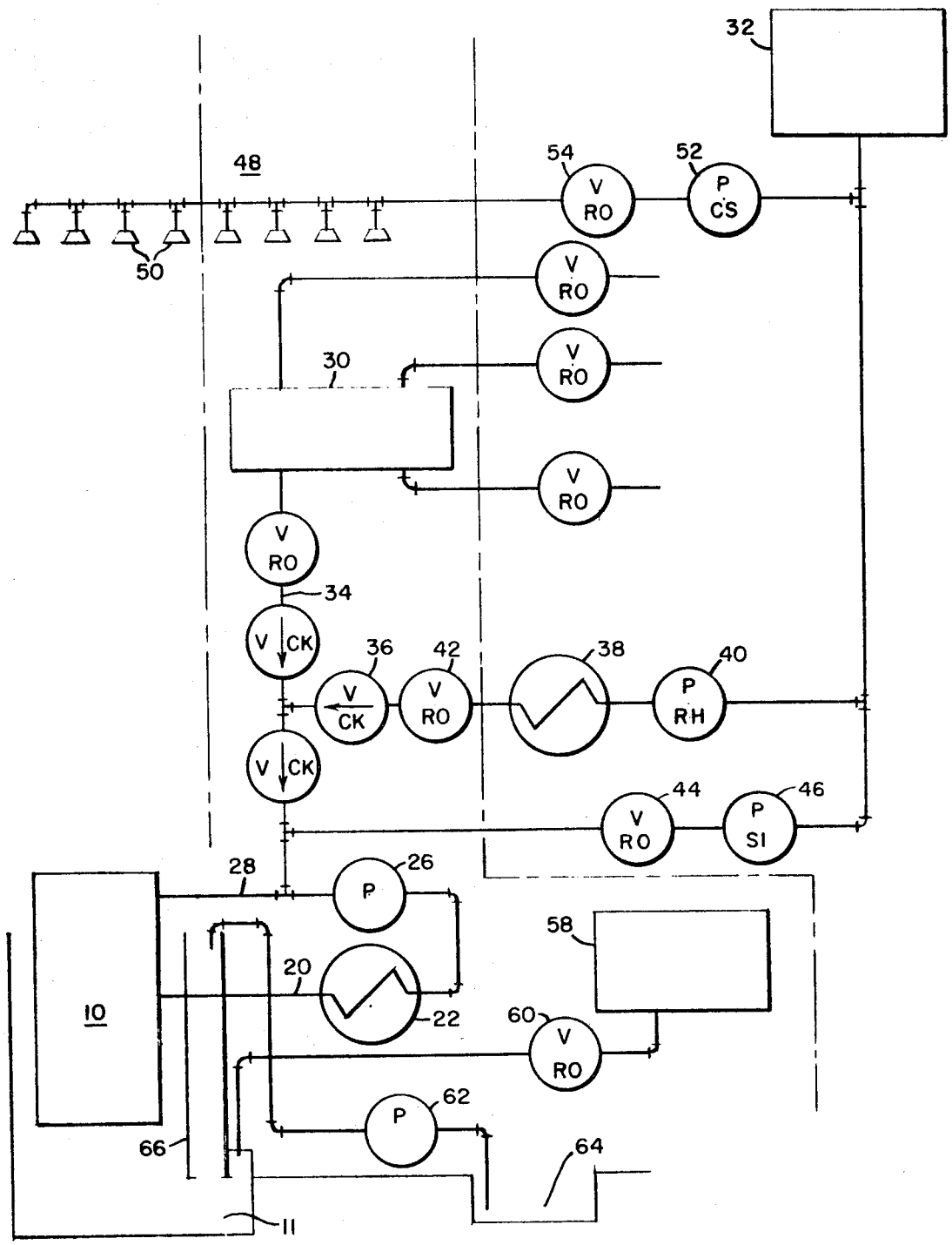
FIG. 3 is a schematic flow diagram of the main coolant and safety systems in accordance with this invention.

As can be noted most clearly in FIG. 3 the emergency cooling systems including the accumulator system, the high head injection system, and the low head injection system primarily operate to inject coolant fluid into the pressure vessel 10 through cold leg conduit 28 as to prevent core melt down. It should be clear however that should the reactor vessel 10 rupture upon the occurrence of, or perhaps because of, the injection of safety coolant from the various above described systems that the emergency procedure outlined would be ineffective in preventing core melt down because the coolant would be swiftly dumped into the dry well 11. As previously indicated dry well 11 provides a substantial space into which coolant would be lost in the event of a vessel rupture. This space must be provided for the bottom instrumentation piping; two elements of which are shown and generally designated by the numeral 56. The instrumentation piping 56 exits from the dry well through an instrumentation passageway 66. The dry well space is necessarily large because of the relative thickness of the bottom instrumentation leads (not shown) within piping 56 so as to maintain a minimum radius of curvature necessary to prevent yielding in the walls of the leads during their withdrawal. The passageway 58 and the substantial space within the dry well 11 are also utilized so as to provide substantial area for installation of the bottom instrumentation and repair of same.

In order to ensure the effectiveness of the various emergency cooling systems, and to prevent core meltdown in the event of a vessel rupture, a means must be provided for minimizing the space to which coolant fluid can be lost upon a rupture, but such means should not inhibit or prevent the repair or proper construction of the instrumentation pipe leads 56. In accordance with this invention, and as shown in the FIGS. 1 and 2 embodiment thereof, a plurality of storage tanks 58 may be provided which are connected to the dry well 11 through a remotely operated valve 60. The tanks 58 are installed inside the containment at an elevation high enough to provide a static head for flow from the tanks 58 into the cavity or dry well 11. The volume of the tanks 58 are set to be equal to the volume of the dry well up to a level which is several inches below the lowest point of the pressure vessel. Thus should a spurious signal, not initiated by an actual loss of coolant accident, initiate dumping from the storage tank 58 no harm would be caused to the pressure vessel 10. The remotely operated valves 60 are opened to dump the contents of the tanks 58 into the dry well 11 upon the occurrence of a loss of coolant accident. Such an accident may be indicated and sensed in various ways, for example, by the sensing of a low pressure condition in the accumulator tanks 30. This condition is generally due to the initiation of the dumping of their contents into the vessel 10.

The active part of the system includes one or more pumps 62 taking suction from the containment sumps 64 and discharging into a stand pipe 66 installed on the instrumentation passageway 56 leading to the dry well 11. The upper end of the stand pipe 66 corresponds to the level of flooding required in the dry well 11 to protect against core melt-down within the pressure vessel 10. Thus if the vessel 10 is intact, liquid filling dry well 11 remains exterior of vessel 10 and core 13 is inundated by liquid injected into vessel 10 by accumulators 30. If vessel 10 has ruptured, then liquid from accumulator 30 will flow out of the vessel 10 through the rupture and depending upon the rupture location, core 13 may no longer be inundated. In this event, liquid flowing into dry well 11 from tank 58 and sump 64 will fill dry well 11 exteriorly of vessel 10 and will substantially prohibit the injected coolant from flowing out of the vessel 10 through the rupture therein.

The pump 62 may be started by the same signal which initiates dumping from the tank 58 and run dry for a short period of time, or until the sump 64 collects sufficient water to provide an adequate source for the pump 62. A level indicator (not shown) of conventional construction may also be utilized to initiate pumping. The coolant fluid collected within the sump 64 comes primarily from four potential sources: the coolant fluid lost from the closed loops upon a loss of coolant accident, the accumulator discharge, pumping from the high and low head safety injection systems, and coolant fluid from the spray heads 50. As can be seen the head requirements of the pump 60 are very low since only pipe resistance and a small static head need be overcome.

The above described system should be accordingly realized to be substantially fail-safe since a spurious signal can only initiate dumping from the tank 58 and initiation of action of the pump 62 cannot result in water flooding the pressure vessel unless this water has been accumulated in the sump 64 due to the occurrence of an actual loss of coolant accident.

Figure 4:
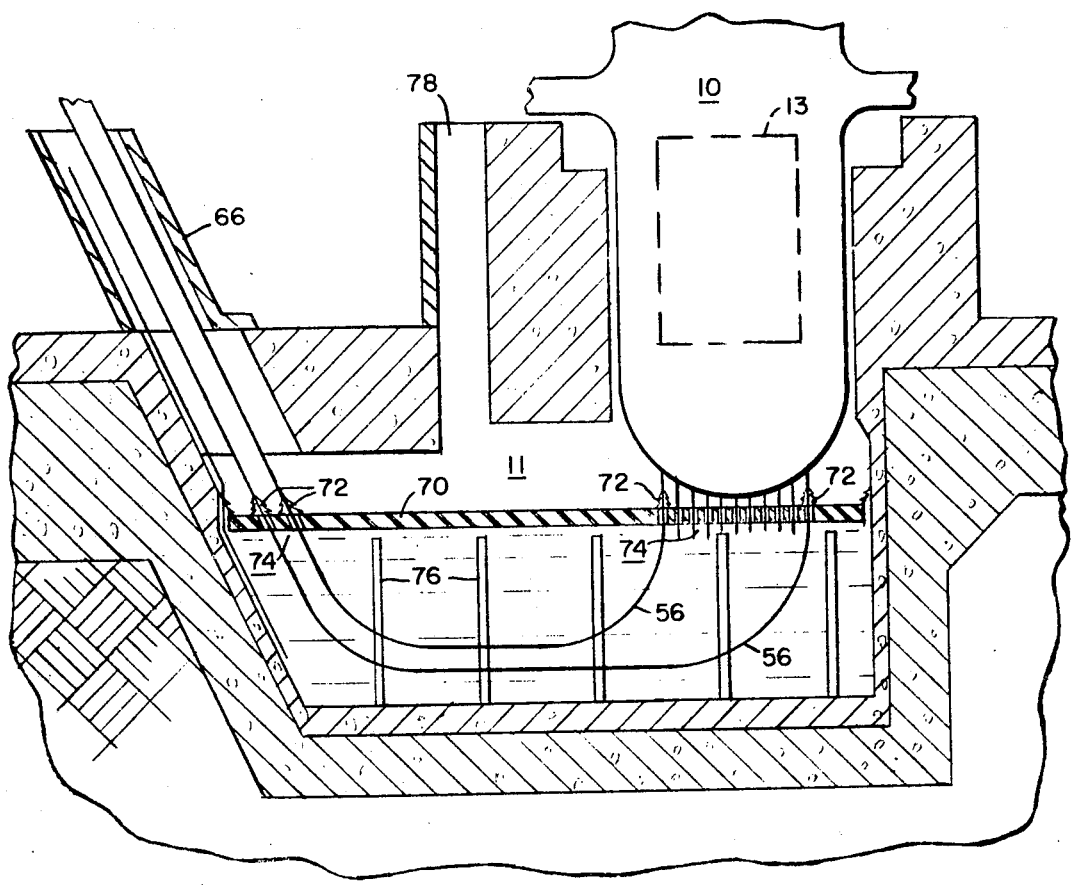
FIG. 4 shows another embodiment of the invention, in schematic form.

Referring now to FIG. 4, wherein the same numerals indicate identical structure, an alternative embodiment of the containment systems in accordance with this invention is shown. In this embodiment the storage tanks 58 and their associated structure are removed and the coolant fluid, such as borated water, which they would contain is stored in a lower portion of the dry well 11. This flooded portion of the dry well 11 desirably is separated from the remainder or dry portion of dry well 11 by suitable means such as a rigid floating seal 70 through which the bottom mounted in-core instrumentation tubing 56 is installed and sealed with waterproof seals 72 over large clearance holes 74. The seals 72 may comprise a bellows-like member of a flexible material. Floating seal 70 is sealed to the reactor cavity walls to completely separate the coolant water from the containment atmosphere so as to prevent evaporation, or the coolant fluid being blown out upon the occurrence of a loss of coolant accident caused by a system rupture located within the dry well 11. Columns 76 may optionally be installed under the floating seal to prevent it being forced down in the event of a loss of coolant accident or blow-down within the dry well 11. Additional venting space such as opening or conduit 78 may additionally be provided coupled to the dry well to quickly convey excess steam from the bottom part of the dry well should a serious blow-down occur within the dry well 11. Optional means such as stirrers, heaters, and coolers may be installed within the dry well to keep the coolant fluid stored therein at a proper temperature and of a proper consistency.

It is also to be noted with respect to the latter embodiment, wherein the coolant fluid is stored within the dry well 11, that such an arrangement also acts as a neutron streaming shield and protects the reactor cavity liner against missiles.

Means such as a sump pump (not shown) may also be provided for removing the coolant fluid from the dry well 11 so that access may be had to the dry well, and the instrumentation piping which it contains, should repairs be necessary.

While there has been shown and described what are considered to be the preferred embodiments of the invention, modifications will readily occur to those skilled in the art. For example, the floating seal 70 could take the form of a large flexible non-metallic seal which separates the dry well 11 into multiple chambers. Or, the space within the dry well 11 under the pressure vessel 10 may be minimized by utilizing materials other than a fluid, e.g., blocks of a solid material such as concrete, which will eliminate a substantial portion of the space which must be filled to prohibit coolant fluid from being lost; while not inhibiting the passage of the pipes 56. Accordingly, it is not desired that the invention be limited to the specific arrangements and embodiments shown and described but rather that the true scope of the invention is intended to be delineated to the appended claims.

We claim:
1. A reactor containment system, which comprises:
   a reactor containment structure having a dry well therein;
   a reactor vessel supportedly received within said dry well and coupled to at least one primary coolant circulating loop;
   a sump within said containment structure for accumulating coolant fluid lost from said primary coolant circulating loops should a break occur in any of said circulating loops;
   means for sensing a break in any of said circulating loops; and
   first means connected to said sump and actuated by said sensing means for injecting the accumulated coolant fluid into said dry well.

2. The nuclear containment system of claim 1 additionally including instrumentation passageways connected to said dry well, and stand pipes on said passageways whereby the dry well may be filled with coolant to a level sufficient to protect the nuclear core against meltdown.

3. The reactor containment system of claim 1 additionally including second means for partially filling said dry well to a level beneath said reactor vessel.

4. The reactor containment system of claim 3 wherein the means for partially filling said dry well comprise at least one storage tank coupled to said dry well.

5. The reactor containment system of claim 3 wherein the second means for partially filling said dry well includes fluid contained within the dry well.

6. The reactor containment system of claim 5 additionally including a sealing means for separating said fluid from said reactor vessel.

7. The reactor containment system of claim 5 wherein the fluid comprises borated water.

8. The reactor containment system of claim 1 or 3 additionally including an emergency coolant injection system connected to at least one of the primary coolant circulating loops.

9. A process for protecting against nuclear core meltdown in the event of a reactor vessel rupture comprising:
   partially filling the dry well which supportedly receives the reactor vessel with fluid to a first level beneath the reactor vessel;
   accumulating the fluid lost from a break in a primary circulating loop; and
   pumping the accumulated fluid as it accumulates into the dry well to a second level at least sufficient to protect against core melt-down.

References Cited
UNITED STATES PATENTS

| | | | |
|---|---|---|---|
| 3,115,450 | 12/1963 | Schanz | 176—37 |
| 3,168,445 | 2/1965 | Ziegler et al. | 176—38 |
| 3,248,298 | 4/1966 | Norman | 176—38 |
| 3,287,226 | 11/1966 | Webb | 176—37 |
| 3,414,472 | 12/1968 | Chave | 176—37 |
| 3,423,286 | 1/1969 | Weems et al. | 176—37 |
| 3,454,466 | 7/1969 | Pitt et al. | 176—38 |

REUBEN EPSTEIN, Primary Examiner

U.S. Cl. X.R.

176—38